United States Patent
Kim et al.

(10) Patent No.: US 7,518,435 B2
(45) Date of Patent: Apr. 14, 2009

(54) PRECHARGED POWER-DOWN BIASING CIRCUIT

(75) Inventors: Kwang Young Kim, Irvine, CA (US); Josephus A. E. P. Van Engelen, Aliso Viejo, CA (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 11/785,216

(22) Filed: Apr. 16, 2007

(65) Prior Publication Data

US 2007/0194836 A1  Aug. 23, 2007

Related U.S. Application Data

(63) Continuation of application No. 10/854,635, filed on May 27, 2004, now Pat. No. 7,205,826.

(51) Int. Cl.
G05F 1/10 (2006.01)
(52) U.S. Cl. ...................................... 327/538
(58) Field of Classification Search ............... 323/312, 323/313, 314, 315, 316; 327/530, 534, 535, 327/537, 538, 539, 540, 541, 543
See application file for complete search history.

(56) References Cited

U.S. PATENT DOCUMENTS

| | | | |
|---|---|---|---|
| 5,654,981 A | 8/1997 | Mahant-Shetti et al. | |
| 6,107,789 A | 8/2000 | Fryer et al. | |
| 6,281,730 B1 | 8/2001 | Vu | |
| 6,509,855 B1 | 1/2003 | Cable | |
| 6,525,598 B1 | 2/2003 | Croman | |
| 6,617,915 B2 | 9/2003 | Rajan | |
| 6,680,605 B2 | 1/2004 | Chen et al. | |

*Primary Examiner*—Jeffrey S Zweizig
(74) *Attorney, Agent, or Firm*—Sterne, Kessler, Goldstein & Fox P.L.L.C.

(57) ABSTRACT

A power-down biasing circuit includes a current source connected to a drain of a first NMOS transistor through a first switch. A gate of the first NMOS transistor is connected to the current source, and a source of the first NMOS transistor is connected to ground. A first pre-chargeable capacitor is connected between the gate of the first NMOS transistor and ground. A plurality of NMOS transistors form a current multiplier and have gates connected to the current reference. A plurality of current mirrors are connected to drains of the plurality of NMOS transistors and to output switches. Each current mirror has a first PMOS transistor whose drain is connected to a drain of a corresponding one of the plurality of NMOS transistors through a second switch, whose gate is connected to the drain of the corresponding one of the plurality of NMOS transistors and whose source is connected to a supply voltage; a second capacitor is connected between the gate of the first PMOS transistor and the supply voltage; and at least two PMOS transistors are connected as a current multiplier to the output switches. Cascode equivalent biasing circuits are described also.

21 Claims, 17 Drawing Sheets

PRECHARGED POWER-DOWN BIASING CIRCUIT

CROSS-REFERENCE TO RELATED APPLICATIONS

The present application is a continuation of U.S. patent application Ser. No. 10/854,635, filed May 27, 2004, entitled, "Precharged Power-Down Biasing Circuit," now U.S. Pat. No. 7,205,826, issued Apr. 17, 2007, which is hereby incorporated by reference in its entirety.

BACKGROUND OF THE INVENTION

1. Field of the Invention

The present invention is related to power-down biasing circuits, and more particularly, to biasing circuits with power-down capability for applications that require rapid power-up.

2. Related Art

There are a number of applications where rapid power-up by a circuit may be required. For example, in some Wi-Fi applications, the transceiver circuit may be normally "asleep," but needs to wake up rapidly when necessary. The wakeup time, or the time for the circuit to go from the power-down state to fully functional (power up, or active) state, may be relatively short.

One option is to have a constant biasing current running through the circuit. This is sometimes known as a bleeding current. This increases the wake-up speed, however, particularly for circuits that are only awake a fraction of the time, this approach runs the battery down relatively quickly.

FIG. 1A illustrates a conventional biasing circuit with power-down capability in its active (power-up) state. As shown in FIG. 1A, a current source Iref sources current to a transistor MN101. Two switches SW101 and SW102 control the state of the transistor MN101. In FIG. 1A, 110 is the NMOS current multiplier, and 111 is the PMOS current multiplier. A filtering capacitor CF101 is used to decouple the circuit from noise on a reference current bias line from the power supply Vdd.

NMOS transistors MN102A-MN102N are used as current multipliers. The purpose of the transistors MN102A-MN102N is to distribute current to the mirror circuit(s) 115. The circuit 120, which is the circuit that needs to be supplied with power, is connected to the mirror circuit 115. Each such mirror circuit 115 is connected to a single transistor MN102A-MN102N, as indicated by the dots in the upper portion of FIG. 1A. PMOS transistor MP101 is connected between the power supply Vdd and the transistor MN102N, and is controlled by switches SW103 and SW104. Note that the mirror circuit 115 is not always necessary. The NMOS current mirror embodiment and a PMOS current mirror embodiment are shown cascaded, which is a common circuit arrangement. One could leave out the PMOS embodiment and connect circuit 120 directly above MN102A-N. Alternatively, one could take out the NMOS embodiment replace MN102N with a current mirror Iref sourcing current from MP101.

During power-down, the gate of MN101 is connected to ground, and the drain is open. When the switch SW102 is open, and the switch SW101 is closed, the capacitance of the capacitor CF101, and the properties of current source Iref determine how long the circuit will take to fully power-up. The mirror circuit 115 is replicated for each of the transistors MN102A-MN102N. The purpose of the transistors MP102A-MP102B is to distribute current to the circuit 120. FIG. 1D shows an equivalent circuit for FIG. 1A, where, during power down, Vc moves to potential where the V-I block can generate minimum current (Iout).

FIG. 1C illustrates another conventional power-down circuit, the primary difference of being the location of the switch SW101, which is between the current source Iref and the drain of NMOS transistor MN101. During power-down, the switch SW101 disconnects the current source Iref from the transistor MN101. The gate of the transistor MN101 is connected to ground. The capacitor CF101 here also serves to filter out the noise from the current source Iref. FIG. 1E shows an equivalent circuit for FIG. 1C, where, during power down, Vc moves to potential where the V-I block can generate minimum current (Iout). FIG. 1B shows an equivalent circuit for both FIG. 1A and 1C, where the V-I block can generate either zero current or minimum current.

FIG. 2 is similar to FIG. 1A, but shows the power-down state compared to FIG. 1A, which shows a power-up state, or active state.

FIG. 3 is an illustration of an equivalent circuit at power-on. In FIG. 3, the transistors MN102 are replaced by a box 303 called current multiplier or control, which receives input from an external source, usually an additional circuit that commands waking up and powering down. Thus, instead of a fixed bias, one can have a controllable bias. The problem with the circuit of FIG. 3 is that each such current mirror 304, such as formed by the transistor MP301 and MP302, adds power-up delay. With an array of such current mirrors 304, the delay becomes quite considerable, and may be unacceptable for particular applications.

Accordingly, what is needed is a power-down biasing circuit that allows for rapid wake-up and is at the same time not affected by high frequency noise on the reference current.

SUMMARY OF THE INVENTION

The present invention relates to a precharged power-down biasing circuit and methods thereof that substantially obviate the disadvantages of the related art.

In one aspect of the present invention there is provided a power-down biasing circuit including a current source connected to a drain of a first NMOS transistor through a first switch. A gate of the first NMOS transistor is connected to the current source, and a source of the first NMOS transistor is connected to ground. A first capacitor is connected between the gate of the first NMOS transistor and ground. A plurality of NMOS transistors form a current multiplier and have gates connected to the current reference. A plurality of current mirrors are connected to drains of the plurality of NMOS transistors and to output switches. Each current mirror has a first PMOS transistor whose drain is connected to a drain of a corresponding one of the plurality of NMOS transistors through a second switch, wherein a gate of the first PMOS transistor is connected to the drain of the corresponding one of the plurality of NMOS transistors and a source of the first PMOS transistor is connected to a supply voltage; a second capacitor connected between the gate of the first PMOS transistor and the supply voltage; and at least one PMOS transistor is connected as a current multiplier to the output switch. A second NMOS transistor may be added in parallel with the current source, with a gate that is driven by the same signal that drives the first switch. A third NMOS transistor may be added in parallel with the current multiplier, with a gate that is driven by an inverse of the signal that drives the first switch.

Additional features and advantages of the invention will be set forth in the description that follows, and in part will be apparent from the description, or may be learned by practice of the invention. The advantages of the invention will be realized and attained by the structure particularly pointed out in the written description and claims hereof as well as the appended drawings.

It is to be understood that both the foregoing general description and the following detailed description are exemplary and explanatory and are intended to provide further explanation of the invention as claimed.

BRIEF DESCRIPTION OF THE FIGURES

The accompanying drawings, which are included to provide a further understanding of the invention and are incorporated in and constitute a part of this specification, illustrate embodiments of the invention and together with the description serve to explain the principles of the invention. In the drawings:

FIG. 3 is an illustration of an equivalent conventional circuit at power-on.

DETAILED DESCRIPTION

Reference will now be made in detail to the preferred embodiments of the present invention, examples of which are illustrated in the accompanying drawings.

Figure 1A:
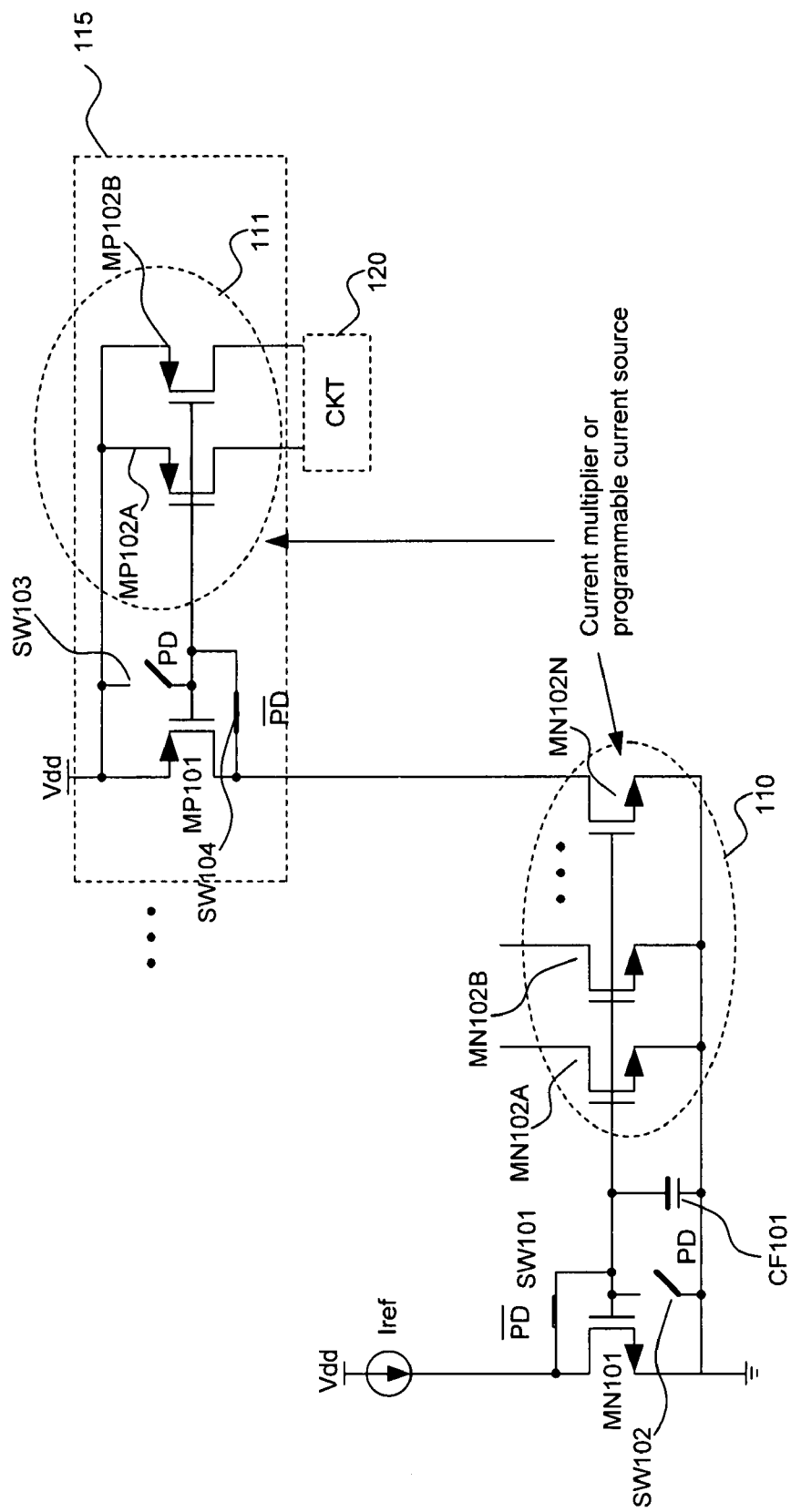
FIGS. 1A-1E illustrate conventional power-down circuits.
Figure 1B:
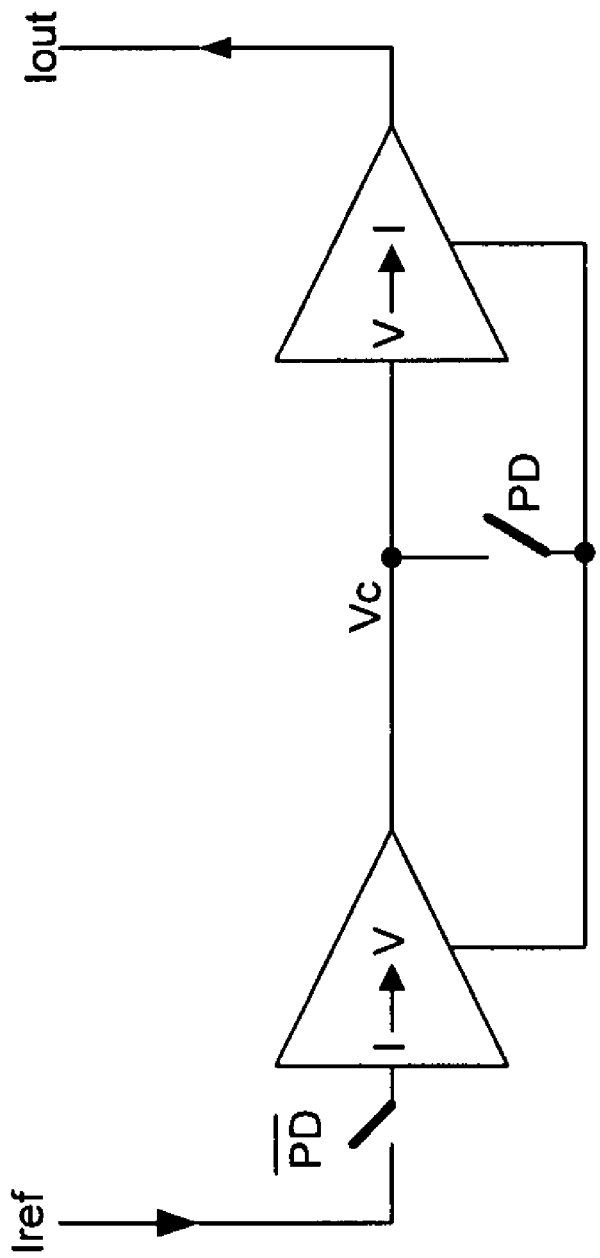
Figure 1C:
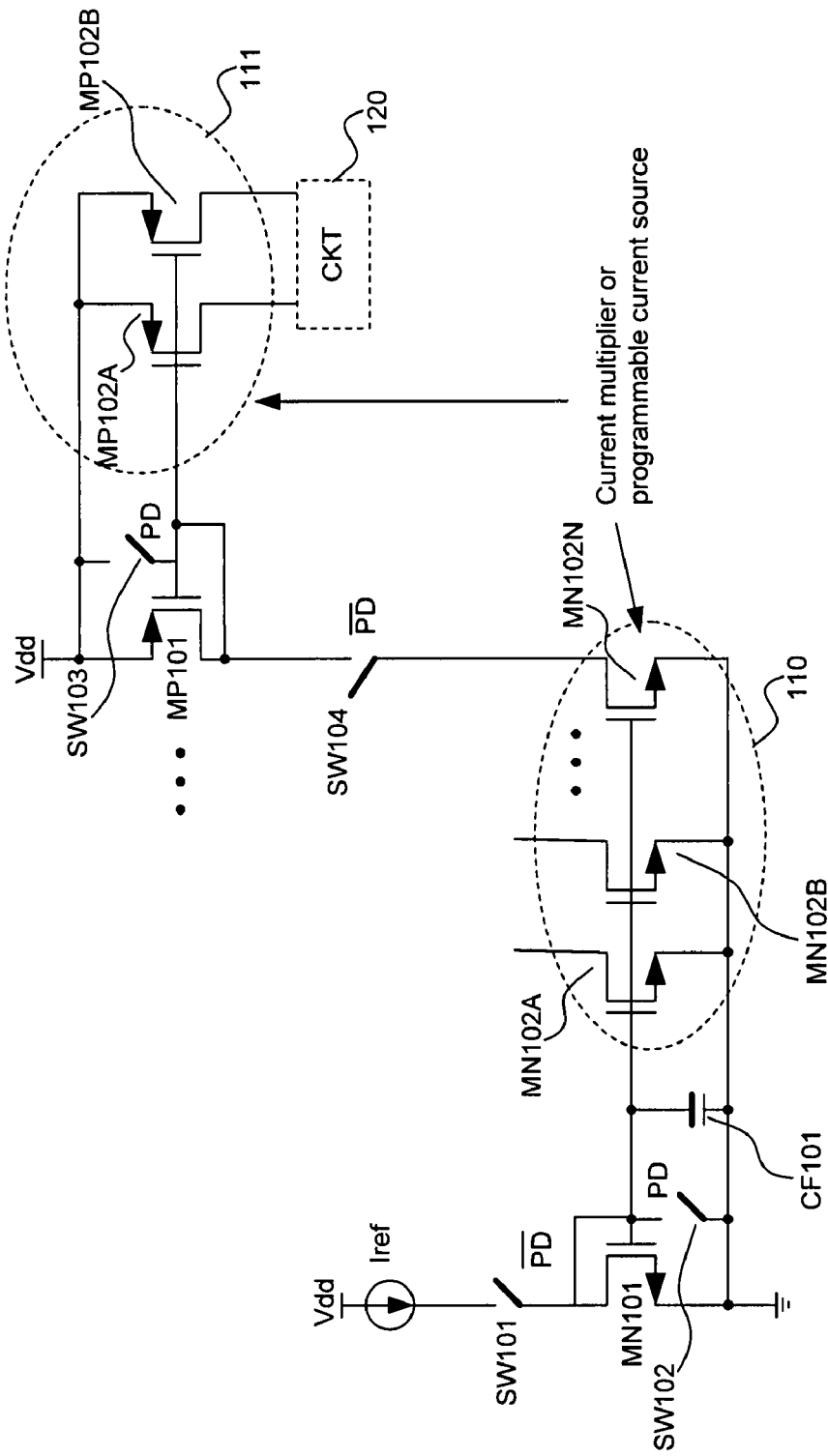
Figure 1D:
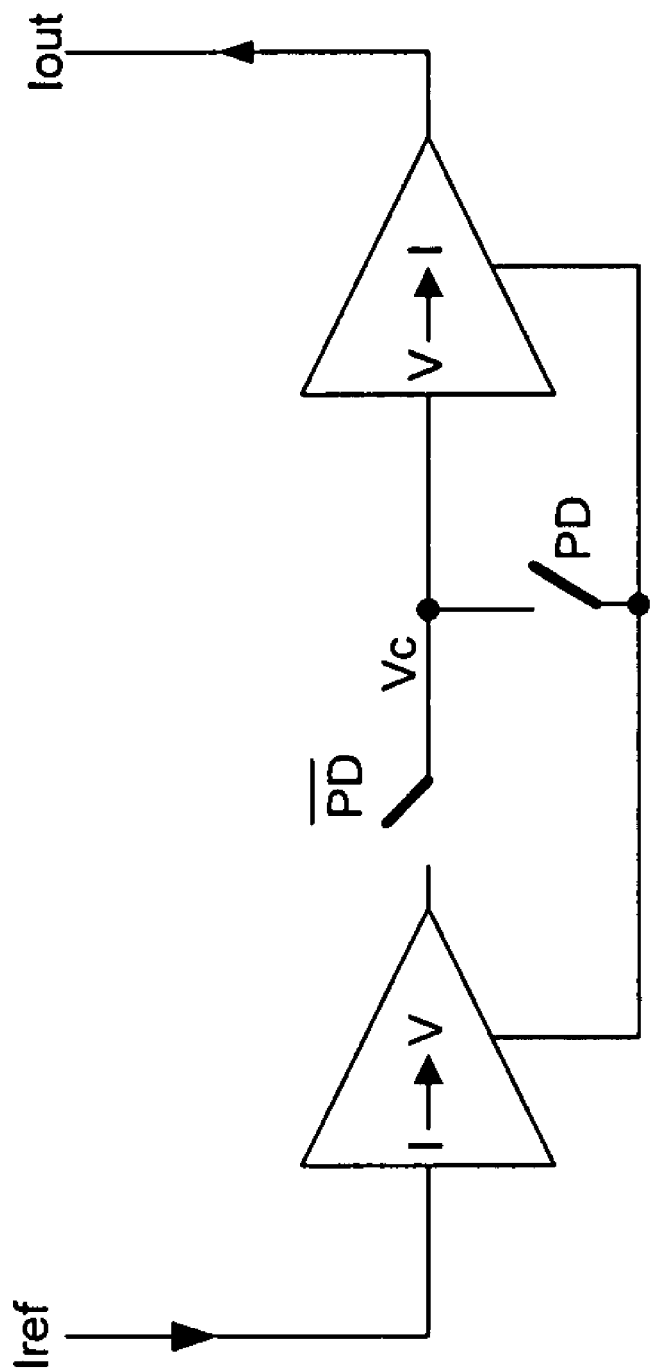
Figure 1E:
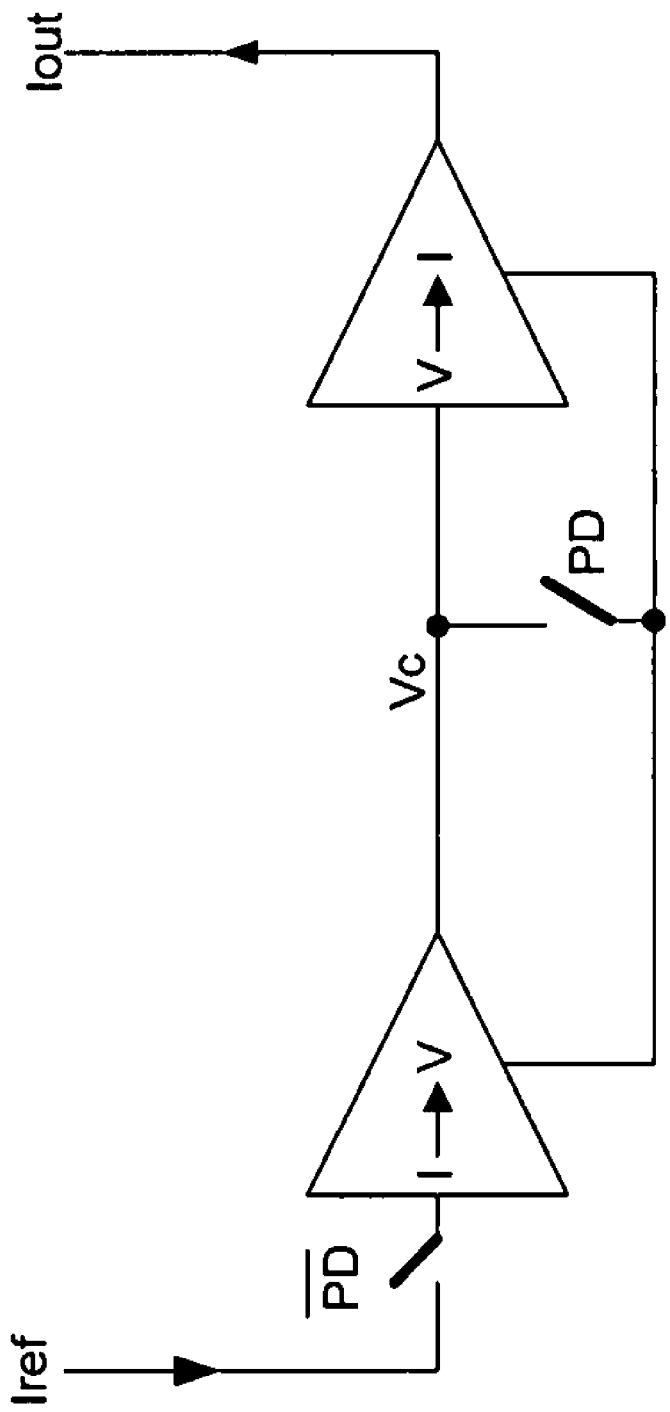
Figure 2:
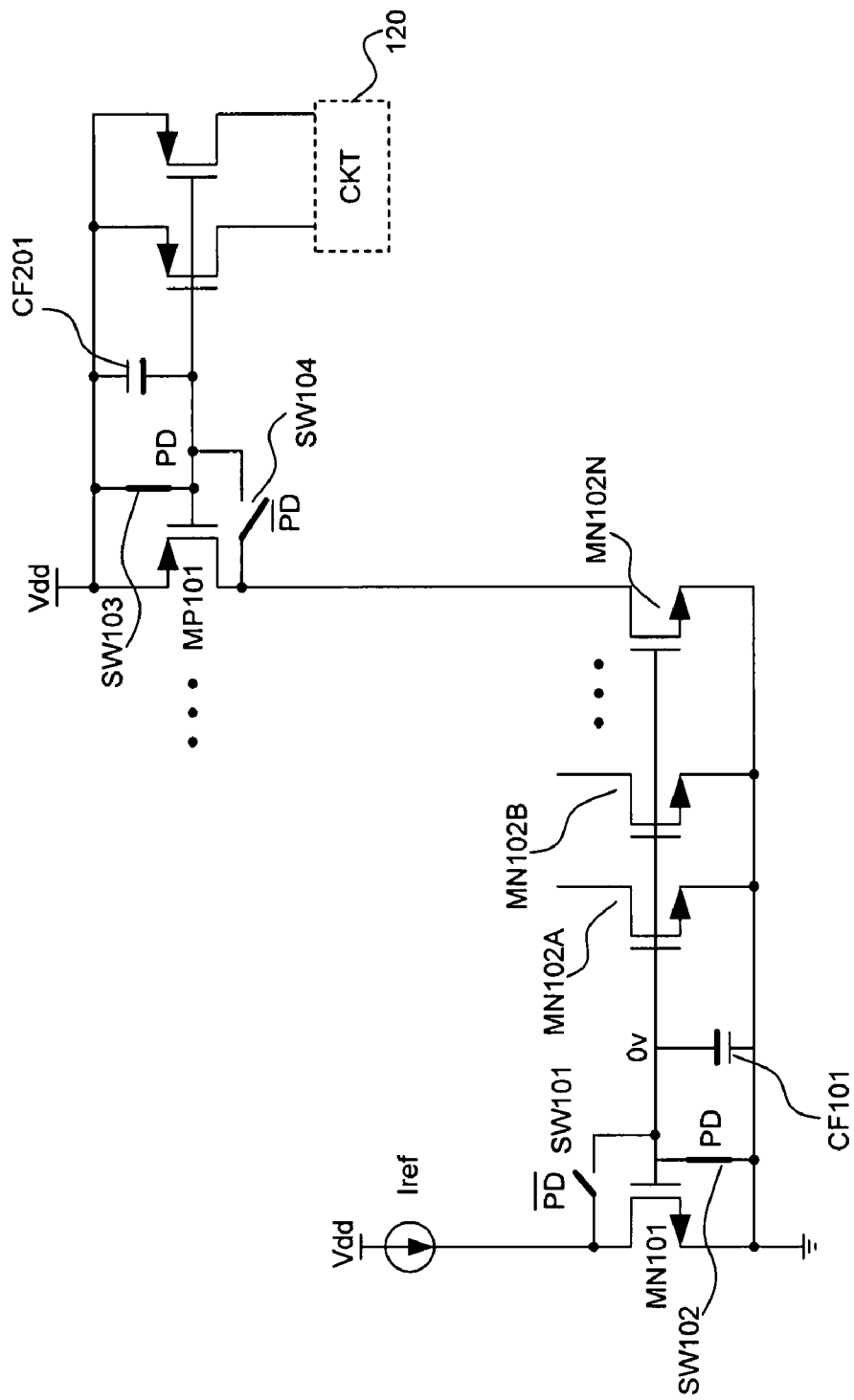
FIG. 2 shows a power-down state of FIG. 1A.
Figure 3:
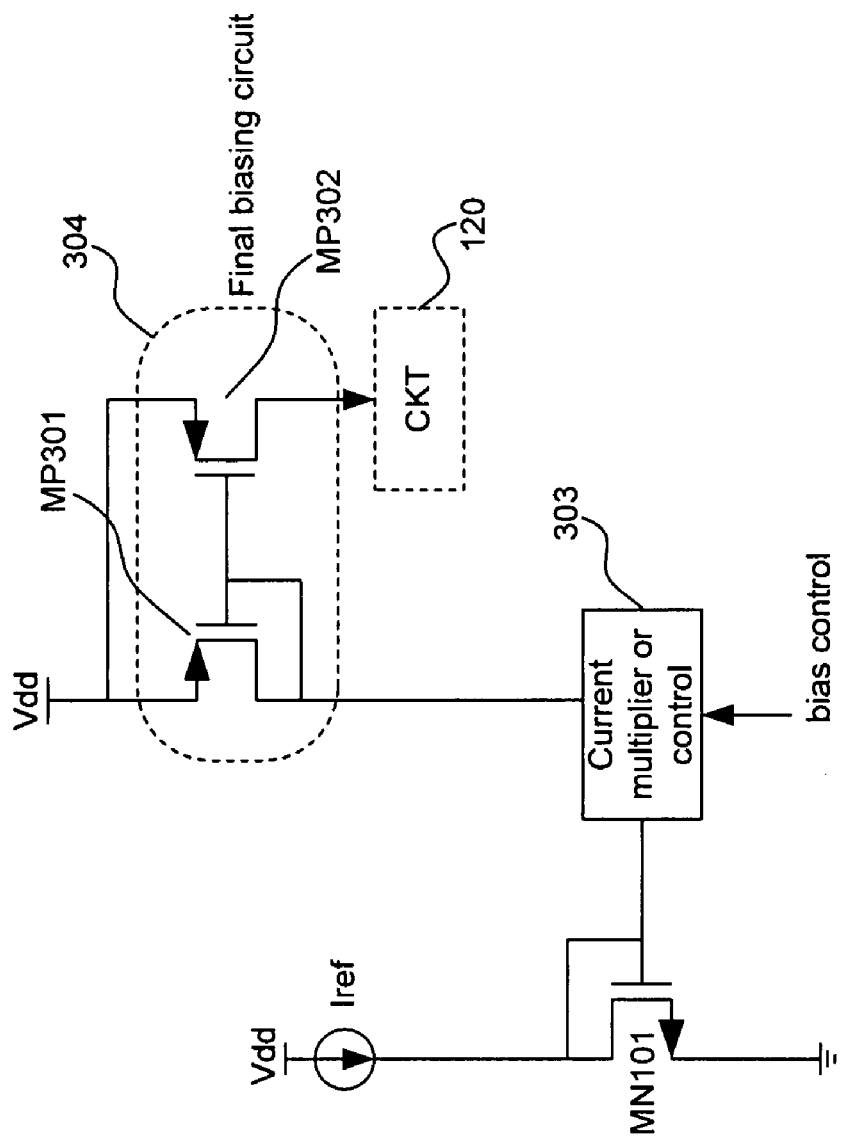
Figure 4A:
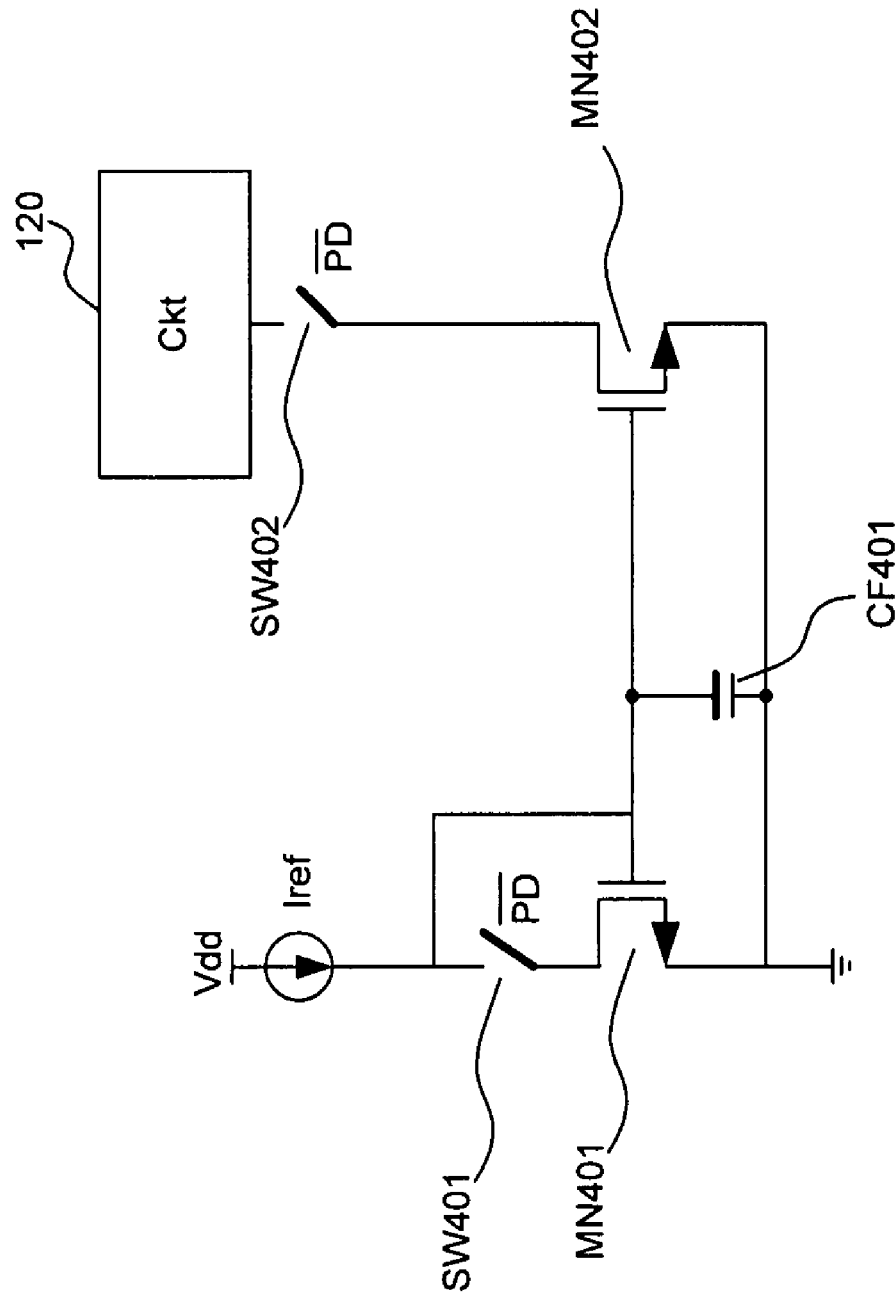
FIGS. 4A-5B illustrate embodiments of the precharged biasing circuit of the present invention.
Figure 4B:
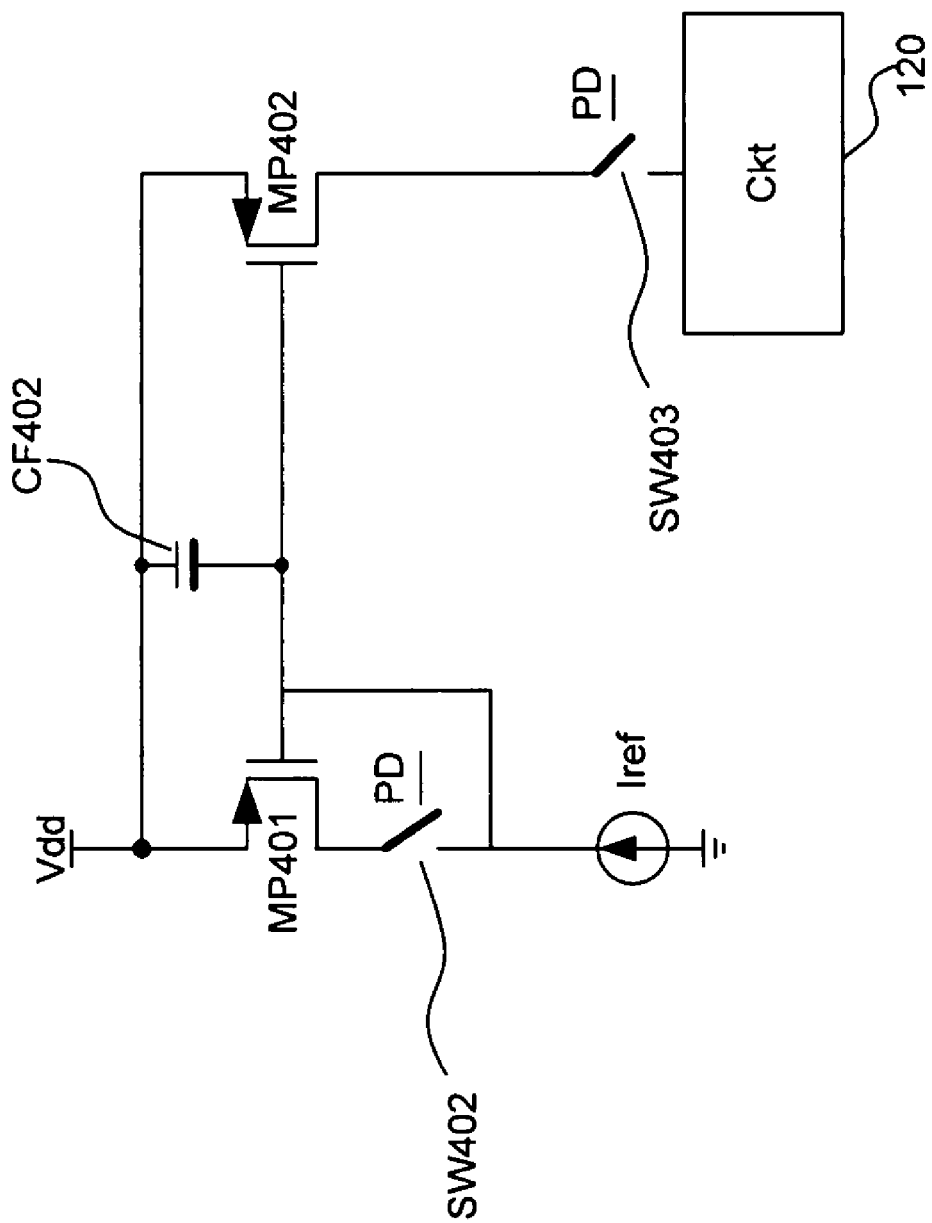
Figure 4C:
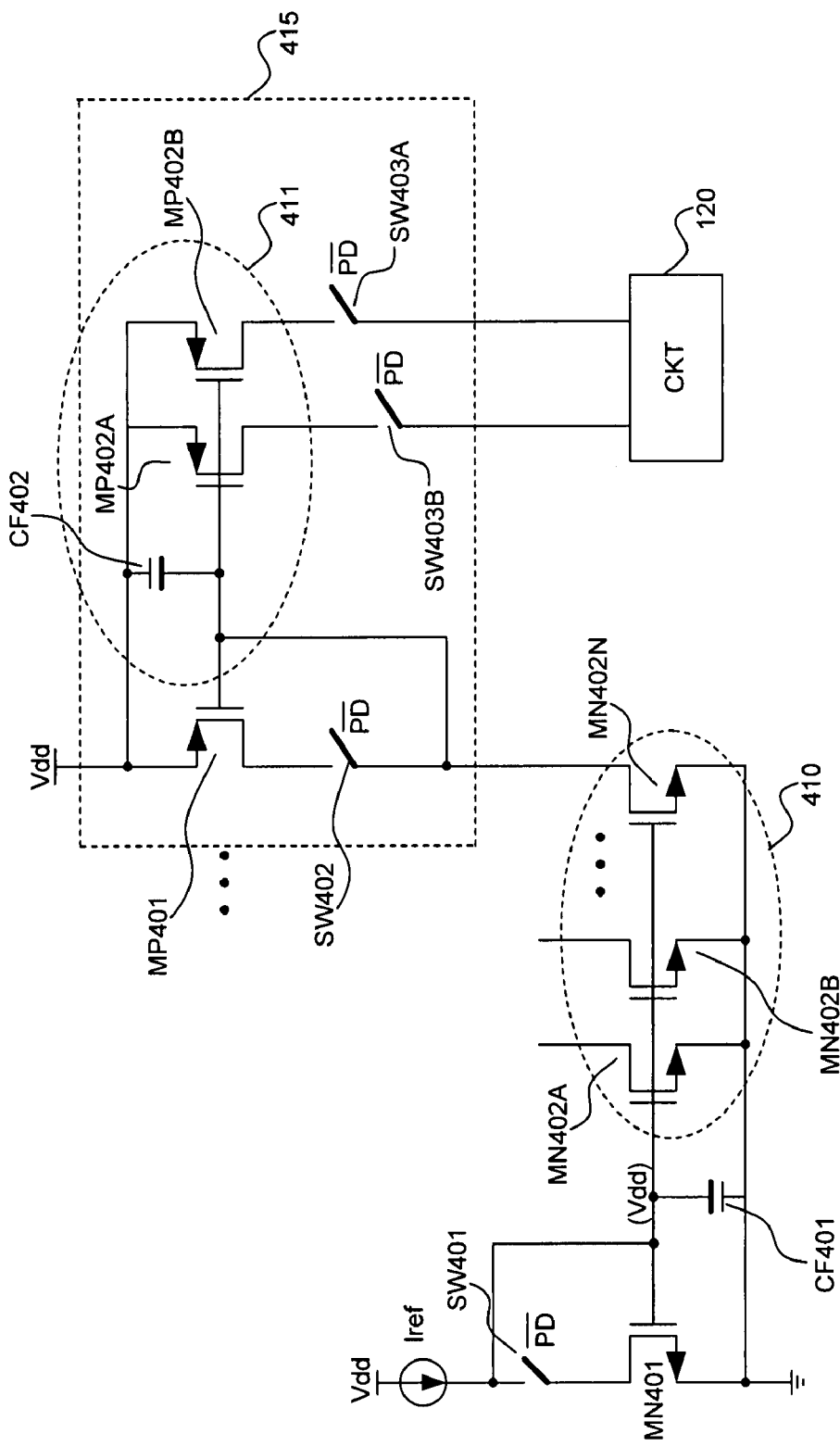
Figure 5A:
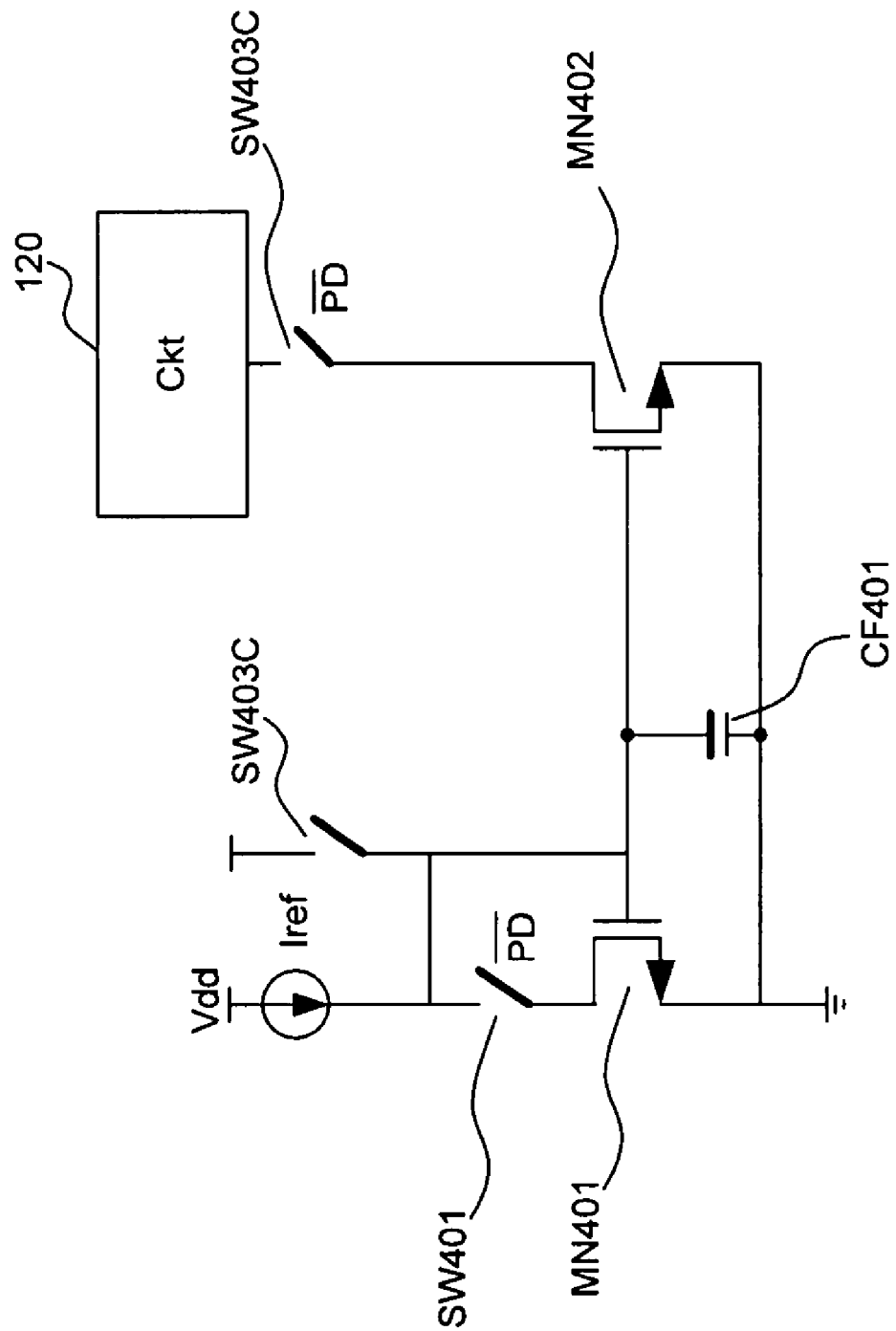
Figure 5B:
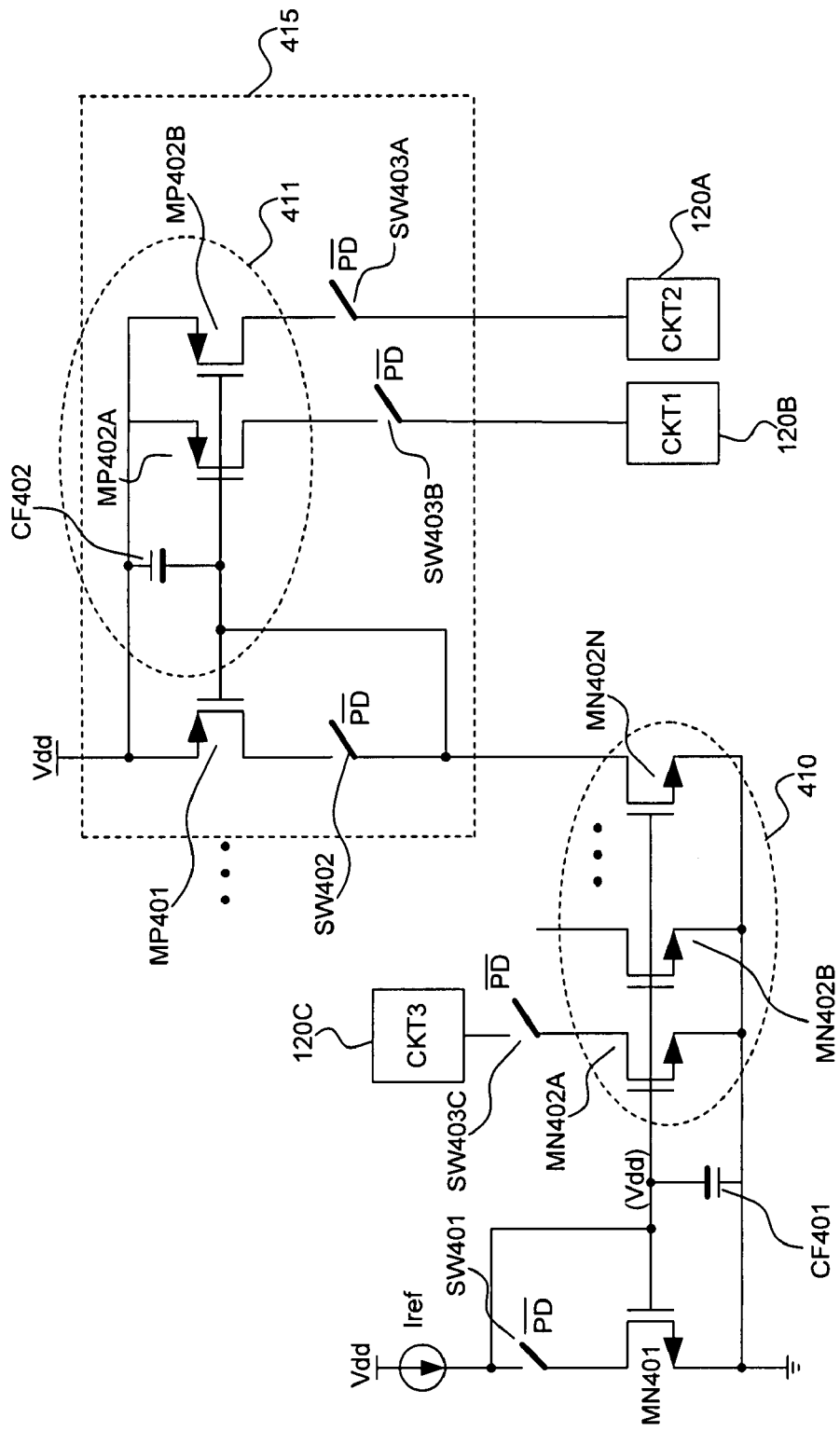

FIGS. 4A-4C illustrate one embodiment of the biasing circuit with power-down capability according to the present invention. FIG. 4A shows an example of a precharge power-down circuit that uses a single NMOS current mirror, FIG. 4B is a PMOS counterpart of the circuit of FIG. 4A. FIG. 4C is a combination of the circuits of FIGS. 4A and 4B, using multiple current mirrors. As shown in FIG. 4C, a current source Iref drives a current into an NMOS transistor MN401. A switch SW401 is located between the drain of the transistor MN401 and Iref. The gate of the transistor MN401 is also connected to the current source Iref. A capacitor CF401 is used both as a high frequency filter and as a precharge capacitor. Current multiplier 410 includes a number of NMOS transistor MN402A-MN402N. Each such transistor MN402A-MN402N is coupled to a corresponding mirror circuit 415, which includes a PMOS transistor MP401 with a switch SW402 as shown. The mirror circuit 415 also includes a current multiplier 411, a capacitor CF402 and PMOS transistors MP402A, MP402B. The mirror circuit 415 is connected to the circuits 120A, 120B through the switches SW403A/SW403B. Transistors MN402 can also be connected to a load, as shown in FIG. 5B.

During power-down, the switch SW401 is open, so that the gate of MN401 goes up to Vdd. That means that from the current source Iref, there is no path to ground during power-down. Therefore, the bias circuit will not dissipate any current. A similar scheme is applied to the PMOS mirror circuit 415. The purpose of the switch SW402 is to block that current from the mirror circuit 415 during power-down. The mirror circuit 415 similarly does not draw any current during power-down. Thus, during power-down, the capacitors CF401 and CF402 are precharged to a relatively high voltage, close to Vdd, or a relatively low voltage, close to GND. This allows for a fast "wake up" during power-up. When the switch SW401 is closed, instead of charging CF401, as happens in conventional circuits, the capacitor CF401 is actually discharged through the transistor MN401. Discharging is usually faster than charging. Charging occurs through the current available from Iref which is fixed. Discharging occurs through the impedances of transistors MN401 or MP401—which is usually faster. But the biggest improvement in the power-up delay is that the output transistor(s) MN402N can supply a lot of current (more than nominal) as soon as switch SW402 closes. (The same is true for MP402A/B and switches SW403A/B to circuit 120). Thus, the power-up time of the circuit of FIG. 4C is faster than the power-up time of conventional circuits. Note that because the gate voltage on the transistors MP402 is close to Vdd (or, where appropriate, to GND), they are able to provide a lot of current to the mirror circuit 415.

Figure 7A:
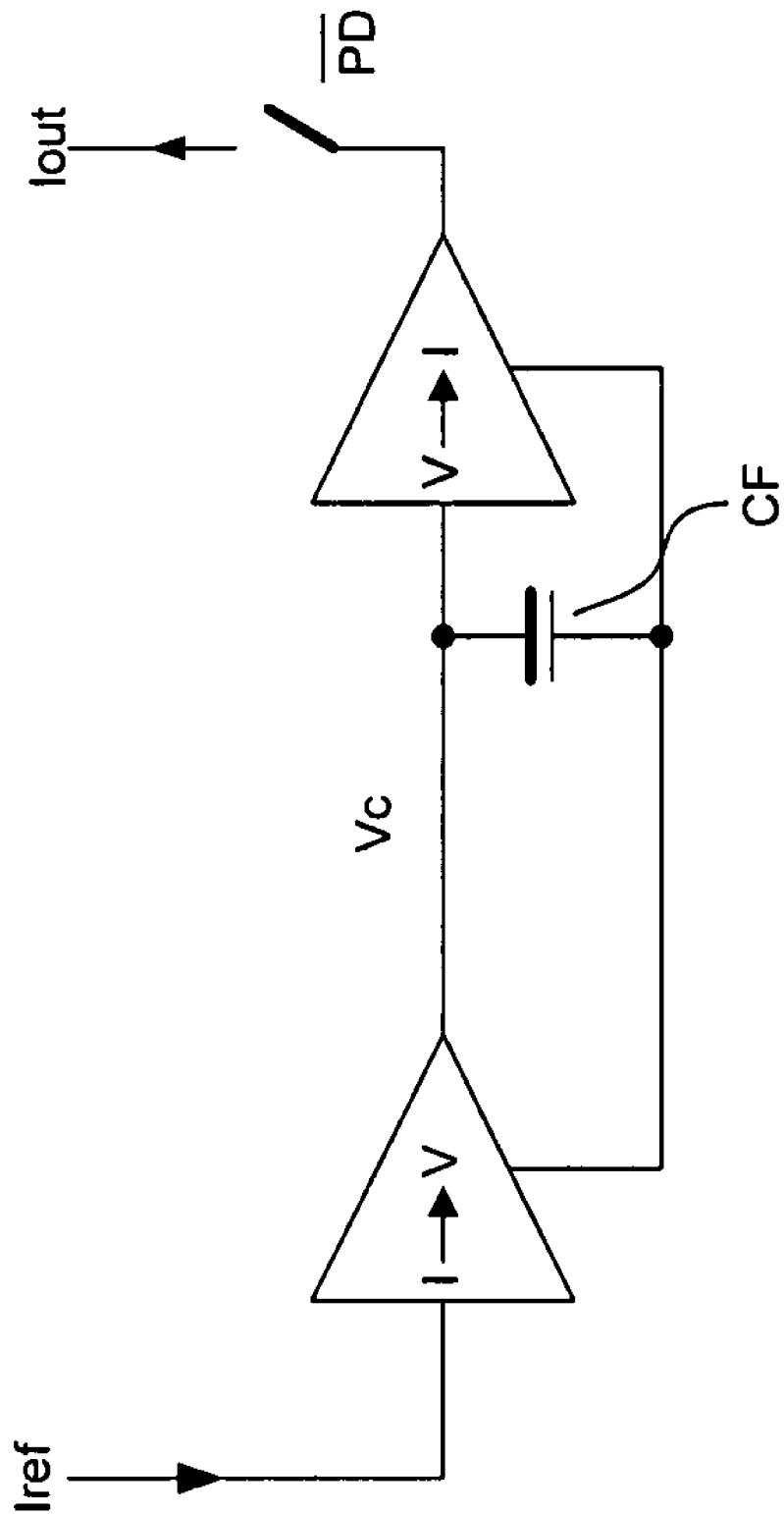
FIG. 7A shows an equivalent circuit of FIG. 4C.

FIG. 7A shows an equivalent circuit of FIG. 4C. As shown in FIG. 7A, during power down, Vc does not move to a potential where the V-I block can generate minimum current Iout. Let Vc of the node charge to a potential that the V-I block can generate larger current Iout, and possibly maximum current, at the beginning of the power up process, than in steady state. The switch shown in FIG. 7A prevents the current Iout from flowing into the remaining circuit.

Figure 4D:
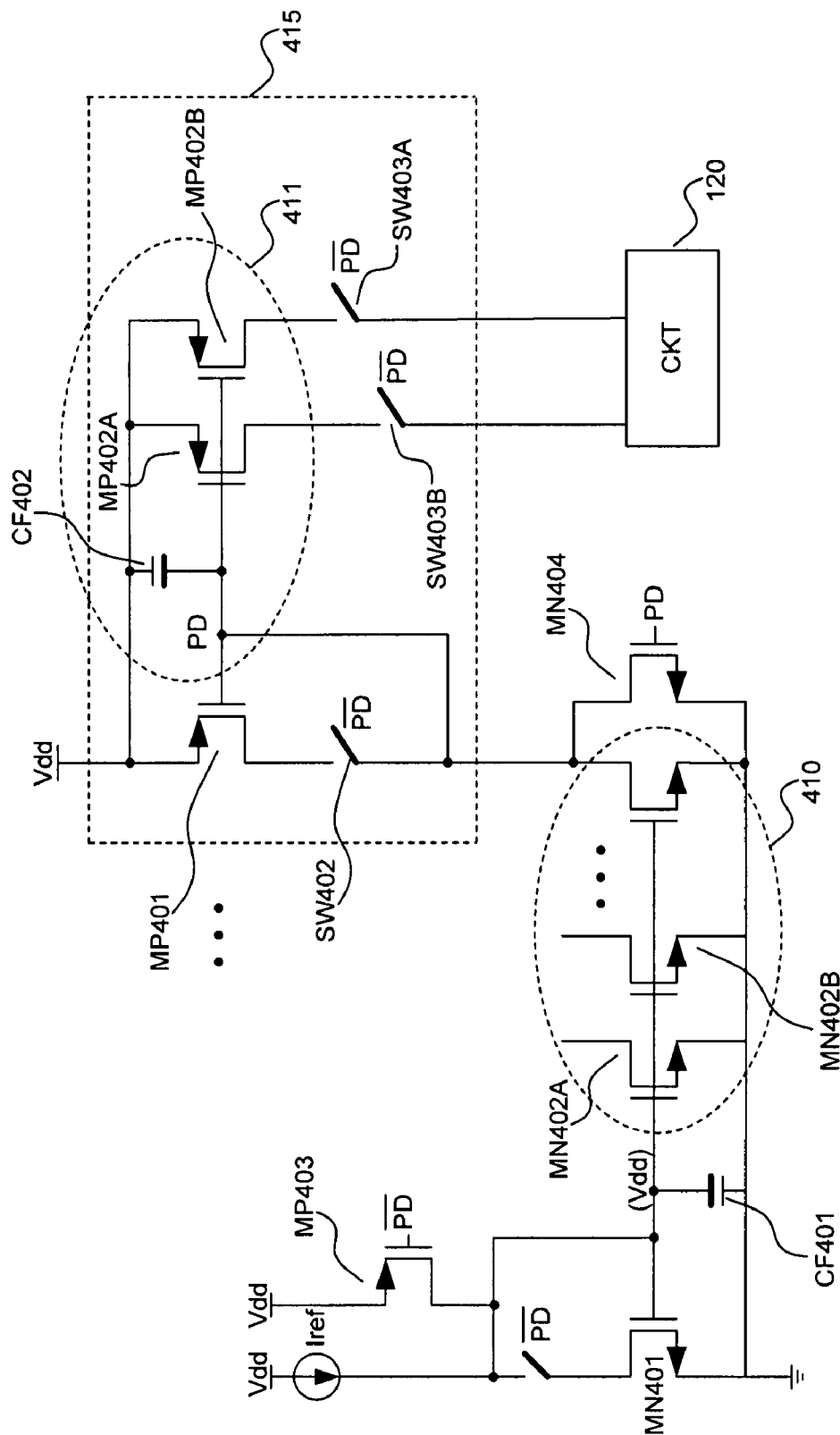
Figure 7B:
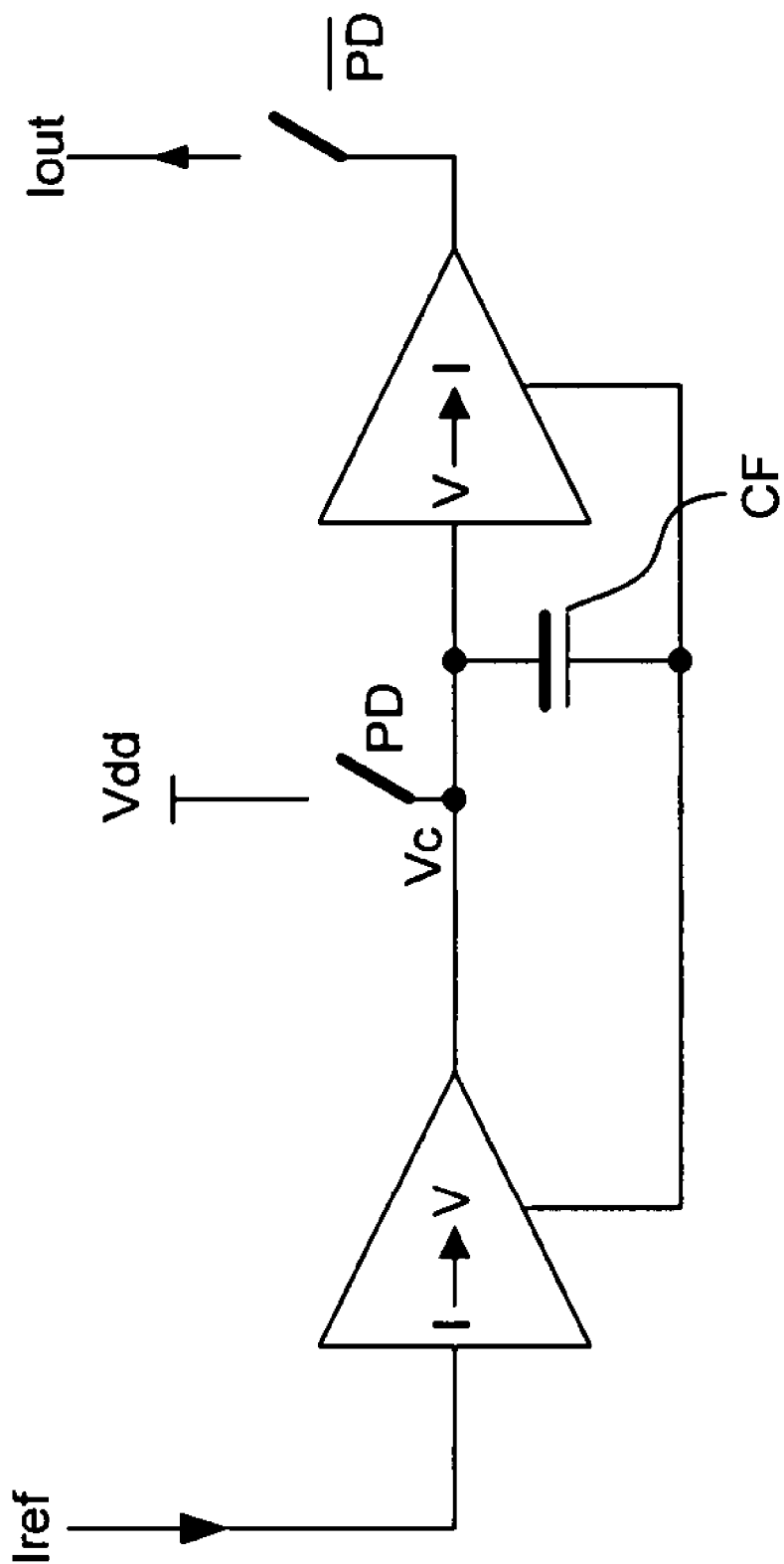
FIG. 7B shows an equivalent circuit of FIG. 4D.

FIG. 4D illustrates another embodiment of the invention. As shown in FIG. 4D, switches MP403 and MN404 are added, to insure that the gates of the transistors MN401 and MN402A are pulled up as close to Vdd as possible (the purpose of MP403), and that there is a direct path to ground (through MN404) during power-down. The addition of these two switches MP403 and MN404 further reduces the power-up time, and assists the precharging of the capacitor CF401. FIG. 7B is a counterpart of FIG. 7A, that corresponds to the circuit of FIG. 4D.

Figure 6A:
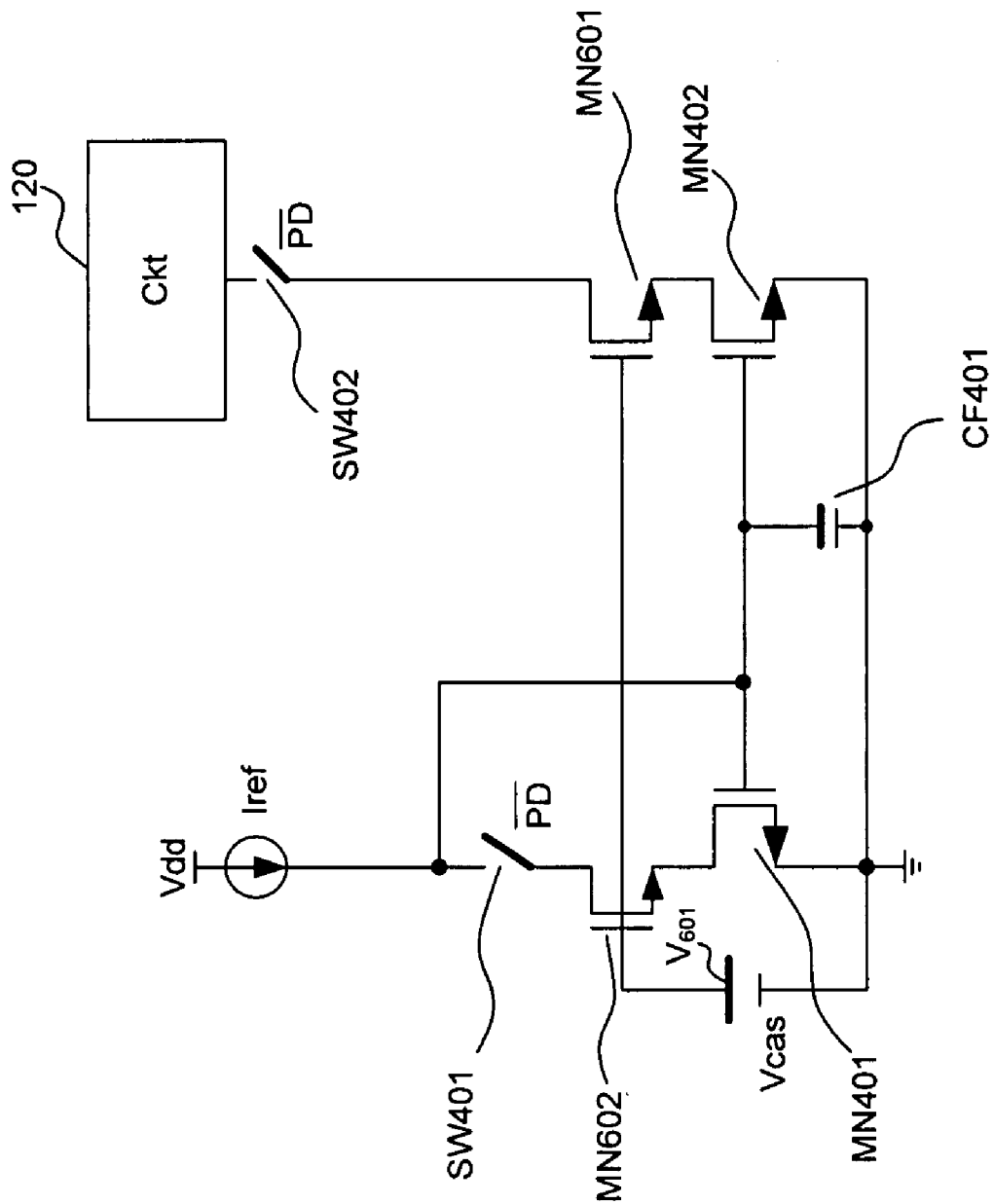
FIGS. 6A-6B show circuit counterparts of the circuits shown in FIGS. 4A-4B, with the addition of cascode transistors.
Figure 6B:
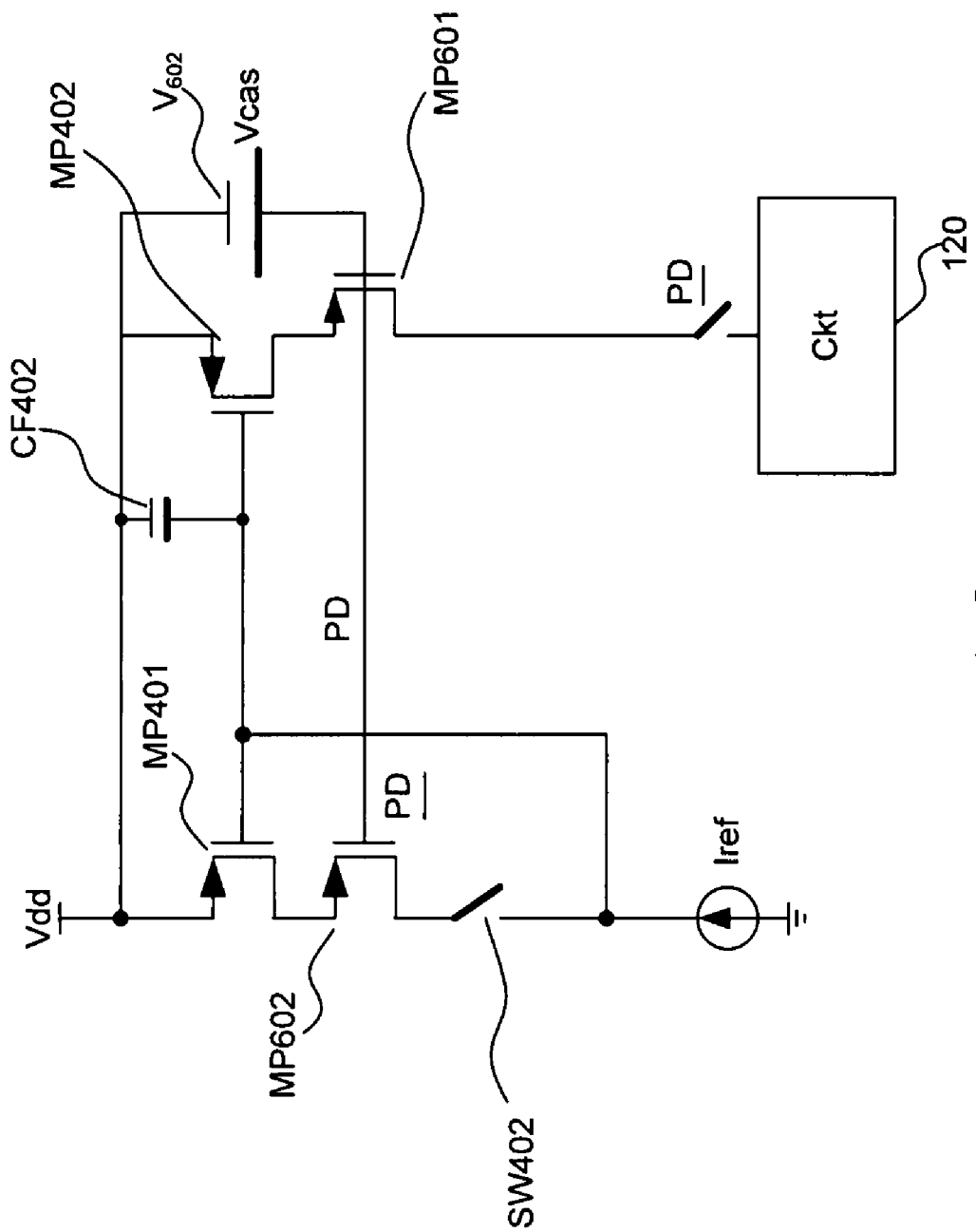

Note that the present invention is applicable to the circuit with a single current mirror, but is particularly useful in the case of multiple current mirrors (see FIG. 5B). FIG. 5A shows an example of a precharge power-down circuit supported by a switch that uses a single NMOS current mirror. The switches in this circuit are usually MOS transistors. However, other switches may be used, for example, bi-polar transistors, CMOS transistors or switches, and any other types of switches. Also, the current mirrors may be simple two-transistor current mirrors as shown in the figures, or more elaborate ones, including cascode transistors, etc. FIGS. 6A-6B show circuit counterparts of the circuits shown in FIGS. 4A-4B, with the addition of cascode transistors MN602, MP602 and DC voltage source V601, V602.

CF401 can be physically implemented as a separate capacitor, or it can be a parasitic cap from one or more devices such as MN401, MN402B, ... MN402N and from wires associated with those devices. Note further that the circuit can be thought of as being more generalized with 'current mirrors' instead of NMOS and PMOS transistors. In that case, a single NMOS or PMOS embodiment can be used (see FIGS. 5A-5B), instead of a cascade of an NMOS and a PMOS embodiments, as is shown in FIG. 4C. A current mirror thus has a current input, a current output and an internal current control node to which the filter capacitor is connected. The current control node is in between an input-current to voltage converter and a voltage-to output-current converter.

CONCLUSION

While various embodiments of the present invention have been described above, it should be understood that they have been presented by way of example only, and not limitation. It will be apparent to persons skilled in the relevant art that various changes in form and detail can be made therein without departing from the spirit and scope of the invention. Thus, the breadth and scope of the present invention should not be limited by any of the above-described exemplary embodiments, but should be defined only in accordance with the following claims and their equivalents.

What is claimed is:

1. In an integrated circuit, a biasing circuit configured to rapidly power up an external circuit from a power-down condition, comprising:
   a first transistor;
   a first switch coupled to the first transistor, wherein the first switch is open during the power-down condition, and is closed during a subsequent powering up of the external circuit;
   a current source coupled to a drain terminal of the first transistor through the first switch;
   a link that connects a gate of the first transistor with the current source bypassing the first switch;
   a precharge capacitor, wherein a first terminal of the precharge capacitor is connected to the current source bypassing the first switch, such that the precharge capacitor gets charged to a voltage close to a supply voltage via the link to the current source during the power-down condition;
   a current multiplier, comprising a second transistor, wherein a gate of the second transistor is connected to the gate of the first transistor; and
   a second switch coupled to the current multiplier, wherein the current multiplier is configured to deliver biasing current to power up the external circuit when the second switch is closed following the power-down condition; and
   a third switch coupled in parallel with the current source.

2. The biasing circuit of claim 1, wherein the first transistor and the current multiplier comprise NMOS transistors.

3. The biasing circuit of claim 2, wherein the biasing circuit further comprises:
   a current mirror that couples the external circuit to the current multiplier through the second switch.

4. The biasing circuit of claim 3, wherein the current mirror comprises PMOS transistors.

5. The biasing circuit of claim 3, wherein the current mirror further comprises a second precharge capacitor.

6. The biasing circuit of claim 1, wherein the current multiplier comprises a plurality of transistors parallel to the second transistor, whose respective gates are connected to the gate of the first transistor.

7. The biasing circuit of claim 6, wherein each of the plurality of transistors parallel to the second transistor delivers biasing current to a corresponding external circuit via a corresponding output switch.

8. The biasing circuit of claim 1, wherein the first transistor and the current multiplier comprise PMOS transistors.

9. The biasing circuit of claim 8, wherein the biasing circuit further comprises: a current mirror that couples the external circuit to the current multiplier through the second switch.

10. The biasing circuit of claim 9, wherein the current mirror comprises NMOS transistors.

11. The biasing circuit of claim 9, wherein the current mirror further comprises a second precharge capacitor.

12. The biasing circuit of claim 1, wherein the first and second switches comprise MOS transistors.

13. The biasing circuit of claim 1, wherein the first and second switches comprise bipolar transistors.

14. The biasing circuit of claim 1, further comprising:
   a first cascade transistor that couples the first transistor with the current source through the first switch, wherein a source terminal of the first cascade transistor is coupled to the drain terminal of the first transistor, and wherein a gate terminal of the first cascode transistor is connected to a DC voltage; and
   a second cascode transistor that couples the current multiplier with the external circuit through the second switch, wherein a source terminal of the second cascode transistor is coupled to a drain terminal of the second transistor included in the current multiplier, and wherein a gate terminal of the second cascode transistor is connected to the gate terminal of the first cascode transistor.

15. The biasing circuit of claim 14, wherein the first transistor, the first cascade transistor, the second transistor, and the second cascode transistor comprise NMOS transistors.

16. The biasing circuit of claim 14, wherein the first transistor, the first cascade transistor, the second transistor, and the second cascode transistor comprise PMOS transistors.

17. In an integrated circuit, a power-down biasing circuit, comprising:
   a first transistor;
   a first switch coupled to the first transistor, wherein the first switch is open during
   a power-down condition;
   a current source coupled to a drain terminal of the first transistor through the first switch;
   a second switch in parallel with the current source;
   a link that connects a gate of the first transistor with the current source bypassing the first switch;
   a precharge capacitor, wherein a first terminal of the precharge capacitor is connected to the current source bypassing the first switch, such that the precharge capacitor gets charged to a voltage close to a supply voltage via the link to the current source during the power-down condition.

18. The biasing circuit of claim 17, wherein the second switch biases the gate of the first transistor close to the supply voltage.

19. The biasing circuit of claim 17, wherein the circuit further comprises:
   a current multiplier, comprising a second transistor, wherein a gate of the second transistor is connected to the gate of the first transistor;
   a third switch coupled to the current multiplier; and
   an external circuit coupled to the current multiplier through the third switch, wherein the current multiplier is configured to deliver biasing current to power up the external circuit when the third switch is closed following the power-down condition.

20. The biasing circuit of claim 19, wherein the circuit further comprises:
   a fourth switch in parallel with the current multiplier configured to provide a path to ground during the power-down condition.

21. The biasing circuit of claim 19, wherein the first, second, third, and fourth switches include one or MOS transistors or bipolar transistors.

* * * * *

UNITED STATES PATENT AND TRADEMARK OFFICE
CERTIFICATE OF CORRECTION

PATENT NO. : 7,518,435 B2  Page 1 of 1
APPLICATION NO. : 11/785216
DATED : April 14, 2009
INVENTOR(S) : Kwang Young Kim It is certified that error appears in the above-identified patent and that said Letters Patent is hereby corrected as shown below:

On the Cover Page, Section (75), Inventors, please change "Josephus A.E.P. Van Engelen" to --Josephus A.E.P. van Engelen--.

Column 6, line 61, please change "include one or MOS" to --include one of MOS--.

Signed and Sealed this

Thirtieth Day of June, 2009

JOHN DOLL
*Acting Director of the United States Patent and Trademark Office*